(No Model.)
R. S. ANDERSON.
PNEUMATIC TIRE.
No. 523,031.                    Patented July 17, 1894.
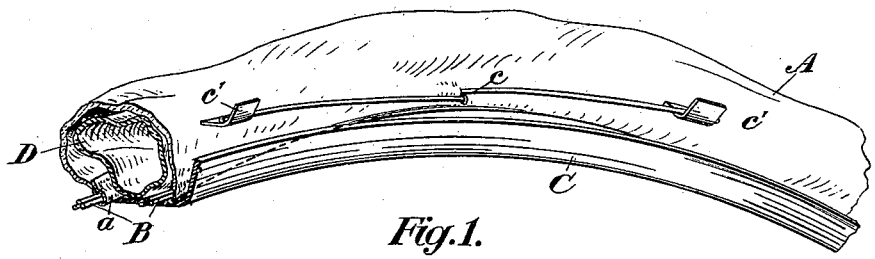
Fig. 1.
Fig. 2.
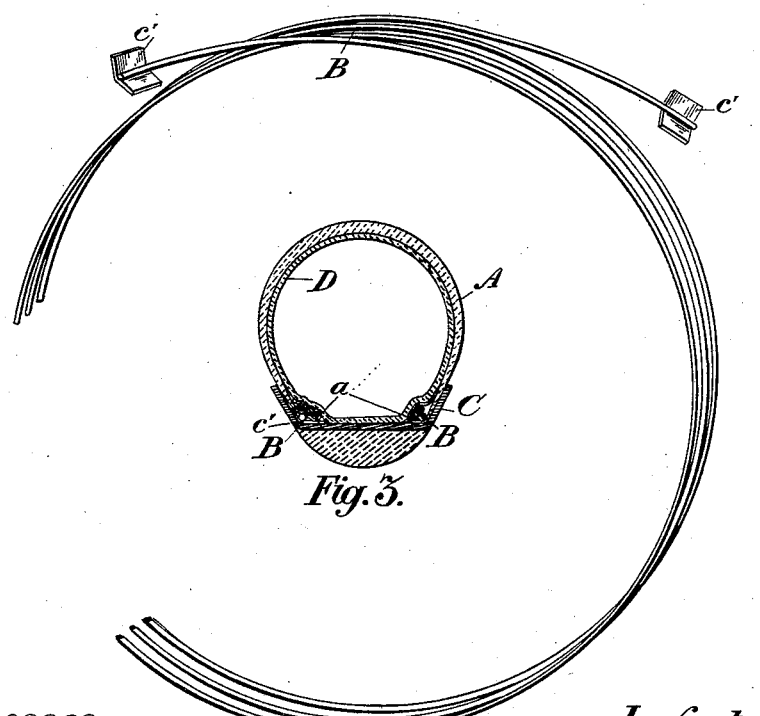
Fig. 3.
Fig. 4.
Witnesses.                      Inventor.

UNITED STATES PATENT OFFICE.

ROBERT SCOTT ANDERSON, OF TORONTO, CANADA, ASSIGNOR OF ONE-FOURTH TO JOHN THOMAS BEATTY, OF SAME PLACE.

PNEUMATIC TIRE.

SPECIFICATION forming part of Letters Patent No. 523,031, dated July 17, 1894.

Application filed December 6, 1893. Serial No. 492,892. (No model.)

*To all whom it may concern:*

Be it known that I, ROBERT SCOTT ANDERSON, machinist, of the city of Toronto, in the county of York, in the Province of Ontario, Canada, have invented certain new and useful Improvements in Pneumatic Tires for Bicycles and Wheels, of which the following is a specification.

My invention relates to improvements in pneumatic tires for bicycles and wheels and the object of the invention is to devise a simple means for retaining the tire in place upon the rim in such a manner that it can be readily and instantaneously removed by simply withdrawing the air out of the tube in the tire and pulling the tire off the rim and it consists essentially of inclosing within each edge of the tire a coil of wire consisting of a plurality of convolutions which allow of being extended so as to be passed over the rim of the wheel but which when drawn close to the surface of the interior of the rim will be caused by the inflation and pressure of the tube to remain tight and securely grip and hold the edges of the tire, the ends of each coil extending through a hole outside the tire in order to permit of the tightening of the coil to securely hold the tire in place upon the rim as hereinafter more particularly explained.

Figure 1, is a perspective view of portion of the tire and rim showing the tube and tire or more properly the cover collapsed ready to be removed from the rim. Fig. 2 is a view of portion of the tire showing it as it would appear when inflated. Fig. 3, is a cross section through the rim, tire and tube showing the position of the convolutions of the wires. Fig. 4, is a detail of the coil.

In the drawings like letters of reference indicate corresponding parts in each figure.

A, is the tire, which is made of any suitable material portion only of the same being shown. The inner edges of the tire, A, are turned inwardly at, $a$, so as to inclose the coils, B, which consist of a plurality of convolutions preferably three.

C, is the rim broad U-shaped in cross section and, D, the air tube, the portion of which corresponding to the portion of the rim being shown.

The position of the convolutions of the coil, B, when drawn tight and tube inflated is shown in Figs. 2 and 3 in which they occupy a position at each side in the angle of the U. The ends of each coil extend through a hole, $c$, made in the tire and have secured to the terminals of the wire, tabs, $c'$, which are designed for the purpose of readily grasping the wires and also for preventing them when the tire is being removed from being drawn through the hole, $c$, should the wires extend only slightly through such hole. The tabs, $c'$, are made of a corresponding angle to the angle of the U and fit within such angle on the outside of the tire—that is between the tire and rim as indicated in Figs. 2 and 3. These tabs are not at all essential but I prefer to use them in order to more conveniently grasp the end of the wires when tightening the uninflated tire upon the rim.

In order to place the tire upon the rim it is simply necessary to pull upon the ends of the wire of the coil on each side, then place them in the angles of the U, in which position they will remain tight for the time being on account of the plurality of coils. The tube is now inflated and the pressure of the tube upon the edge of the rim when filled will securely hold the coil of wire in position without the slightest possibility of them extending so that the tire when the tube is inflated will be held in position upon the rim without any danger whatever of its being displaced in the slightest degree.

In order to remove the tire it is simply necessary to withdraw the air from the tube when as the coils are now free to extend into a circle of greater diameter the tire may be taken off the rim without the slightest difficulty.

From this description it will be seen that I provide a very simple and effective manner of fastening the tire securely in place upon the rim without end fastenings for the wire as would be necessary if a single wire was passed through the edge of the tire.

What I claim as my invention is—

In a pneumatic tire for bicycles and wheels, the combination with the tire, tube and rim, of a wire coil consisting of a plurality of convolutions secured in each edge of the tire and held normally in place upon the rim by the pressure of the tube when inflated but allowable of extension upon the air pressure being removed from the tube and having the ends extending out in opposite directions through a hole, $c$, outside of the edge of the tire and tabs, $c'$, secured on the terminals of such ends as and for the purpose specified.

ROBERT SCOTT ANDERSON.

Witnesses:
B. BOYD,
H. G. S. YOUNG.